(12) United States Patent
Shiao et al.

(10) Patent No.: US 8,469,561 B2
(45) Date of Patent: Jun. 25, 2013

(54) ROAD-ADAPTIVE HEADLIGHT FOR MOTORCYCLES

(75) Inventors: YaoJung Shiao, Taipei (TW);
Chun-Cheng Chen, Kaohsiung (TW)

(73) Assignee: National Taipei University of Technology, Taipei (TW)

( * ) Notice: Subject to any disclaimer, the term of this patent is extended or adjusted under 35 U.S.C. 154(b) by 351 days.

(21) Appl. No.: 12/902,535

(22) Filed: Oct. 12, 2010

(65) Prior Publication Data
US 2011/0211359 A1  Sep. 1, 2011

(30) Foreign Application Priority Data
Feb. 26, 2010  (TW) .................. 99105688 A

(51) Int. Cl.
*B62J 6/00* (2006.01)
*F21V 33/00* (2006.01)
(52) U.S. Cl.
USPC ............ 362/475; 362/473; 362/476; 362/545
(58) Field of Classification Search
USPC ................... 362/473, 475–476, 545
See application file for complete search history.

(56) References Cited

U.S. PATENT DOCUMENTS

| 7,201,501 B2 * | 4/2007 | Chigusa et al. | 362/465 |
| 7,318,662 B2 * | 1/2008 | Takeda et al. | 362/475 |
| 7,686,488 B2 * | 3/2010 | Inoue et al. | 362/509 |

* cited by examiner

*Primary Examiner* — Sean Gramling
(74) *Attorney, Agent, or Firm* — Apex Juris, pllc; Tracy M. Heims

(57) ABSTRACT

A road-adaptive headlight for motorcycles includes a curved base plate having a left curved portion divided from top to bottom into a left-banking lighting zone and a left-crossing lighting zone, a right curved portion divided from top to bottom into a right-banking lighting zone and a right-crossing lighting zone, and a middle curved portion divided from top to bottom into a high-speed lighting zone, a main lighting zone and a horizontal lighting zone. LED light sources are provided in each of the above-mentioned zones. A power source assembly drives the base plate to incline upward or downward and to turn clockwise or counterclockwise. A controller is electrically connected to the LED light sources and the power source assembly for controlling the operation thereof. Thus, different headlight beam patterns can be quickly and flexibly produced under control to ensure increased road visibility and motorcycle riding safety.

5 Claims, 6 Drawing Sheets

ROAD-ADAPTIVE HEADLIGHT FOR MOTORCYCLES

CROSS-REFERENCE TO RELATED APPLICATION

This non-provisional application claims priority under 35 U.S.C. §119(a) on Patent Application No(s). 099105688 filed in Taiwan, R.O.C. on 26 Feb. 2010, the entire contents of which are hereby incorporated by reference.

FIELD OF THE INVENTION

The present invention relates to a road-adaptive headlight for motorcycles, and more particularly to a road-adaptive headlight for motorcycles that can quickly produce different headlight beam patterns to increase road visibility and safety in motorcycle riding.

BACKGROUND OF THE INVENTION

A conventional motorcycle headlight can only provide two working modes, namely, a low-beam mode and a high-beam mode. However, in some riding conditions, the conventional motorcycle headlight fails to provide suitable and sufficient road illumination. For example, when the motorcycle has a rearward shifted center of gravity, or has an upward inclined front end when bumping along a rough road, or passes through a curved road, light beams from the motorcycle headlight might not be able to fully project on and illuminate the road to thereby cause danger in riding motorcycle. Therefore, there are increasing demands for a road adaptive motorcycle headlight, which is also referred to as an advanced motorcycle headlight.

According to the currently available road adaptive motorcycle headlight technique, a motor is used to drive the headlight to adjust its horizontal, sideward, or angular position. Either a headlight base or a reflection mirror is driven to achieve the positional adjustment of the headlight. However, the currently available motorcycle headlight beam adjusting technique has the disadvantages of slow response speed, high manufacturing cost, low flexibility in changing the headlight illuminating angles, unable to achieve change of headlight beam patterns, and low design flexibility in headlight appearance.

In recent years, a road adaptive motorcycle headlight technique using multiple light-emitting diodes (LEDs) as the light sources thereof has been developed. The multiple LED light sources are grouped and individually controlled to emit or not emit light beams, in order to show different headlight beam patterns.

More specifically, the currently available LED road adaptive motorcycle headlight techniques can be divided into two types. One of the two types applies the present LED light technique in the mass production of headlights and uses two or three groups of LED light sources for low beams, high beams and turning, respectively. The other type uses ultra-high-brightness LED light sources as a design basis, and multiple LED light sources are arrayed at specific positions and angles to separately emit light beams under control according to actual need in different road conditions, so as to show required headlight beam patterns.

While the above-described LED road adaptive motorcycle headlight has quick response time, high flexibility in headlight beam patterns and low maintenance cost, it has the disadvantage of non-continuous headlight beam pattern shifting, jumped headlight beam patterns, using a large number of LED light sources, producing a high amount of heat by the LED light sources, and causing discomfort to a rider's eyes during the headlight beam pattern shifting.

It is therefore desirable and tried by the inventor to develop an improved road adaptive headlight device for motorcycle, so that a motorcycle headlight can quickly and flexibly produce different headlight beam patterns to ensure good road visibility and safety in motorcycle riding.

SUMMARY OF THE INVENTION

A primary object of the present invention is to provide a road-adaptive headlight for motorcycles that can quickly and flexibly produce different headlight beam patterns to ensure good road visibility and safety in motorcycle riding.

To achieve the above and other objects, the road-adaptive headlight for motorcycles according to the present invention is implemented by arranging a plurality of LED light sources on a curved base plate at specific positions and angles, steering the whole base plate to turn by a power source under control of a controller, so that the motorcycle headlight can quickly and flexibly produce different headlight beam patterns to ensure good road visibility and safety in motorcycle riding.

According to a preferred embodiment thereof, the road-adaptive headlight for motorcycles of the present invention includes a base plate, a plurality of LED light sources, a power source, and a controller. The base plate is a curved member and includes a left curved portion, a right curved portion, and a middle curved portion located between the left and the right curved portion. The left curved portion is divided from top to bottom into a left-banking lighting zone and a left-crossing lighting zone; the right curved portion is divided from top to bottom into a right-banking lighting zone and a right-crossing lighting zone; and the middle curved portion is divided from top to bottom into a high-speed lighting zone, a main lighting zone and a horizontal lighting zone. The plurality of LED light sources is provided in each of the left-banking lighting zone, the left-crossing lighting zone, the right-banking lighting zone, the right-crossing lighting zone, the high-speed lighting zone, the main lighting zone, and the horizontal lighting zone. The power source assembly is connected to and drives the base plate to incline upward or downward and to turn clockwise or counterclockwise. The controller is electrically connected to the LED light sources and the power source assembly for controlling the operation thereof.

By arranging the LED light sources on the curved base plate at specific positions and angles and turning the whole base plate using the power source under control of the controller, the motorcycle headlight can quickly and flexibly produce different headlight beam patterns to increase road visibility and ensure the safety in motorcycle riding.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
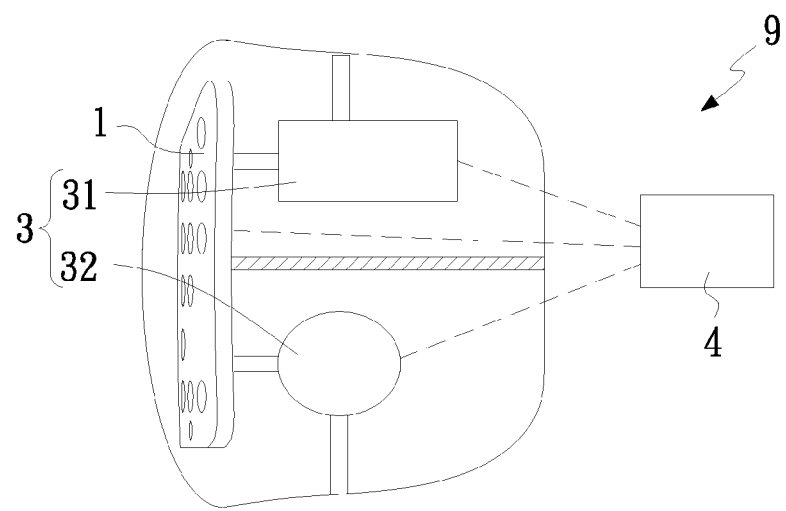
FIG. 1 shows the configuration of a road-adaptive headlight for motorcycles according to a preferred embodiment of the present invention.

Please refer to FIG. 1 that shows the configuration of a road-adaptive headlight for motorcycles 9 according to a preferred embodiment of the present invention.

Figure 2:
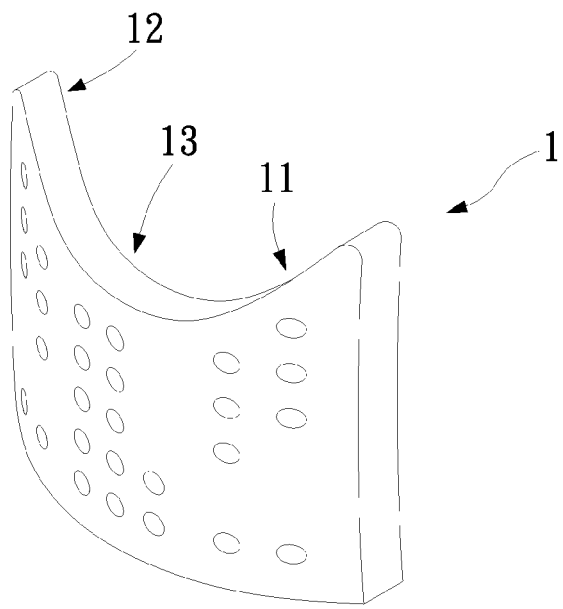
FIG. 2 is a front perspective view of a base plate for the road-adaptive headlight of FIG. 1.
Figure 3:
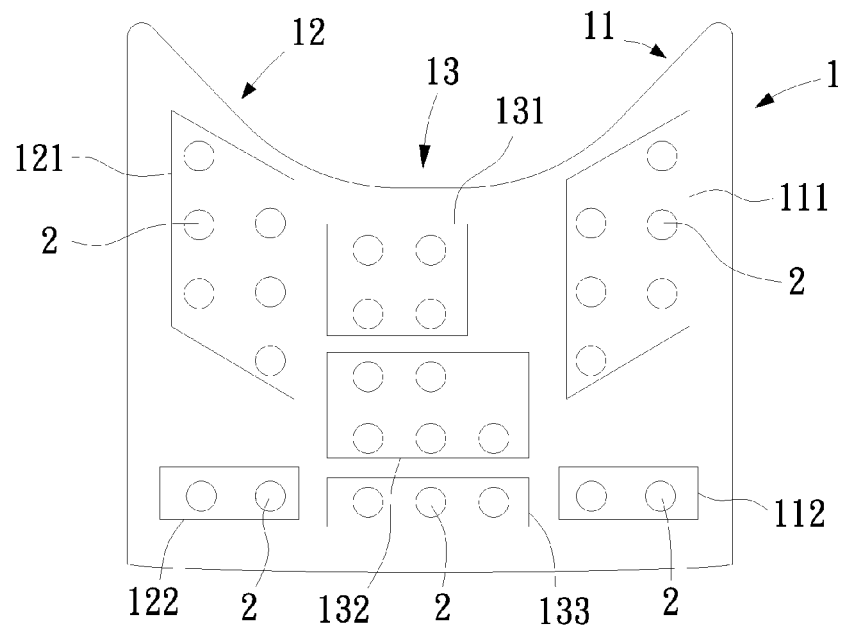
FIG. 3 is a front view of the base plate of FIG. 2.

FIG. 2 is a front perspective view of a base plate 1 for the road-adaptive headlight for motorcycles 9, and FIG. 3 is a front view of the base plate 1. Please refer to FIGS. 1, 2 and 3 at the same time.

As shown, the road-adaptive headlight for motorcycles 9 includes a base plate 1, a plurality of LED light sources 2, a power source assembly 3, and a controller 4.

As can be seen in FIG. 2, the base plate 1 is a curved member. In the illustrated preferred embodiment, the base plate 1 is so designed that it has a vertical curve angle about two degrees and a horizontal curve angle about ten degrees. However, it is understood the above-mentioned angles are only a preferred embodiment and the base plate 1 can of course be designed to have other curve angles. Further, the base plate 1 includes a left curved portion 11, a right curved portion 12, and a middle curved portion 13 located between the left and the right curved portion 11, 12. As can be seen in FIG. 3, the left curved portion 11 is divided from top to bottom into a left-banking lighting zone 111 and a left-crossing lighting zone 112. Similarly, the right curved portion 12 is divided from top to bottom into a right-banking lighting zone 121 and a right-crossing lighting zone 122; and the middle curved portion 13 is divided from top to bottom into a high-speed lighting zone 131, a main lighting zone 132, and a horizontal lighting zone 133.

The above-mentioned left-banking lighting zone 111, left-crossing lighting zone 112, right-banking lighting zone 121, right-crossing lighting zone 122, high-speed lighting zone 131, main lighting zone 132, and horizontal lighting zone 133 are respectively provided with a set of LED light sources 2. In the illustrated preferred embodiment, the LED light sources 2 are high-brightness LEDs 2.

Moreover, the power source assembly 3 is connected to the base plate 1 for driving the base plate 1 to incline upward or downward and to turn clockwise and counterclockwise. The controller 4 is electrically connected to the plurality of LED light sources 2 and the power source assembly 3 for controlling the operation thereof.

Figure 4:
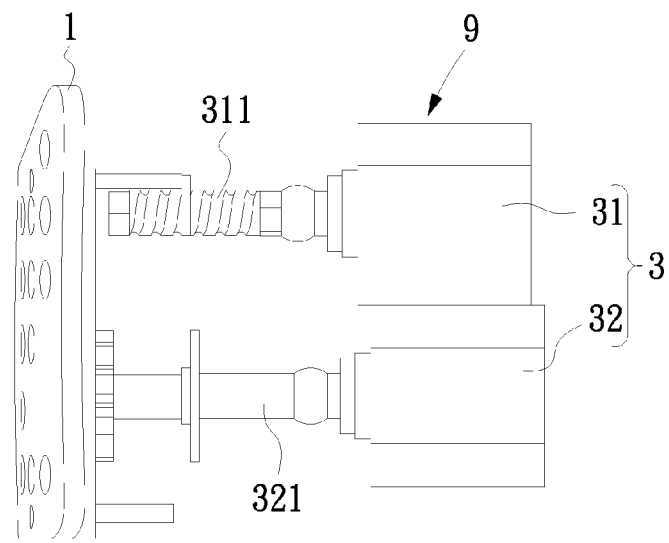
FIG. 4 is a side view showing the configuration of a power source for the road-adaptive headlight of FIG. 1.

FIG. 4 shows the configuration of the power source assembly 3 for the illustrated preferred embodiment of the road-adaptive headlight for motorcycles 9. Please refer to FIGS. 1 and 4 at the same time. In the illustrated embodiment, the power source assembly 3 includes a first power source 31 and a second power source 32, which are respectively a motor. The first power source 31 is associated with the base plate 1 via a guide screw rod 311 for driving the base plate 1 to incline upward or downward; and the second power source 32 is associated with the base plate 1 via a connecting rod 321 for driving the base plate 1 to turn about the connecting rod 321. Alternatively, the second power source 32 can be first associated with a reduction gear set (not shown) via the connecting rod 321, and the reduction gear set is then associated with a further connecting rod (not shown). The further connecting rod is then connected to the base plate 1 for driving the base plate 1 to turn about the further connecting rod. The connecting rod 321 and the further connecting rod are held in place with fixing plates (not shown).

Figure 5:
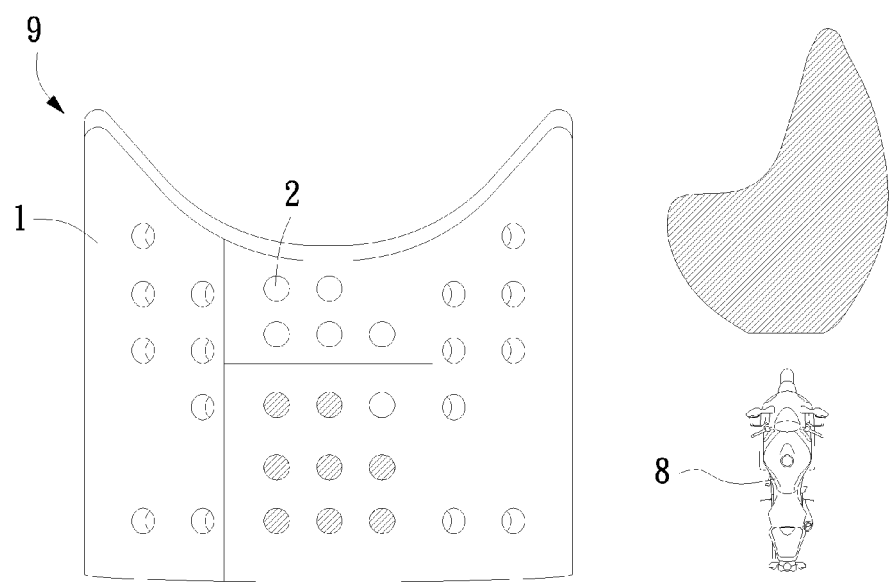
FIG. 5 illustrates the operating light sources and the illuminated area provided by the road-adaptive headlight of FIG. 1 in a first motorcycle riding condition.
Figure 6:
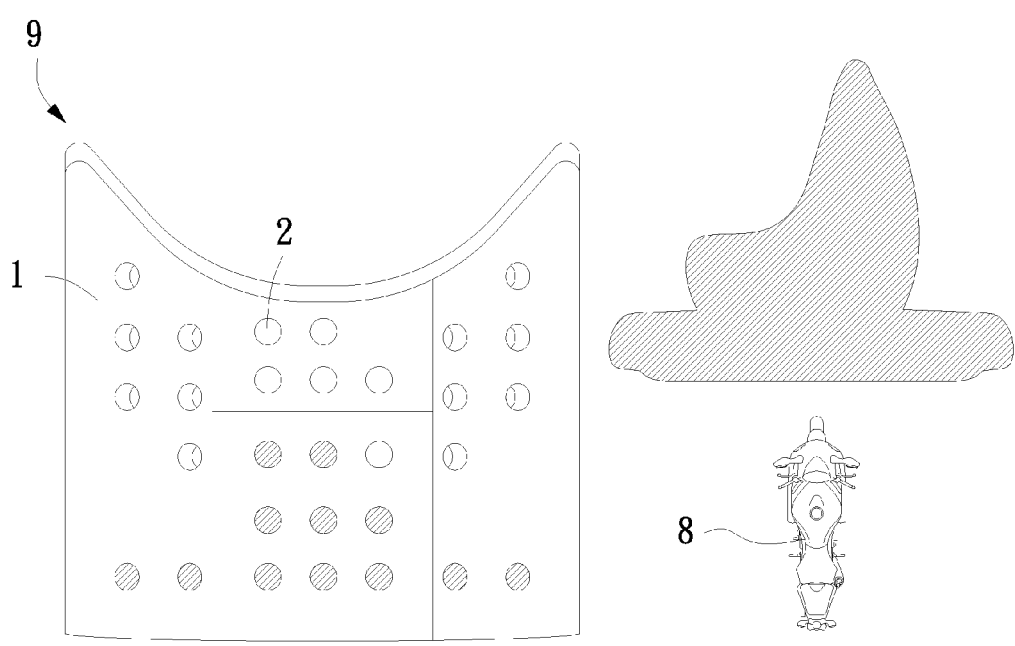
FIG. 6 illustrates the operating light sources and the illuminated area provided by the road-adaptive headlight of FIG. 1 in a second motorcycle riding condition.
Figure 7:
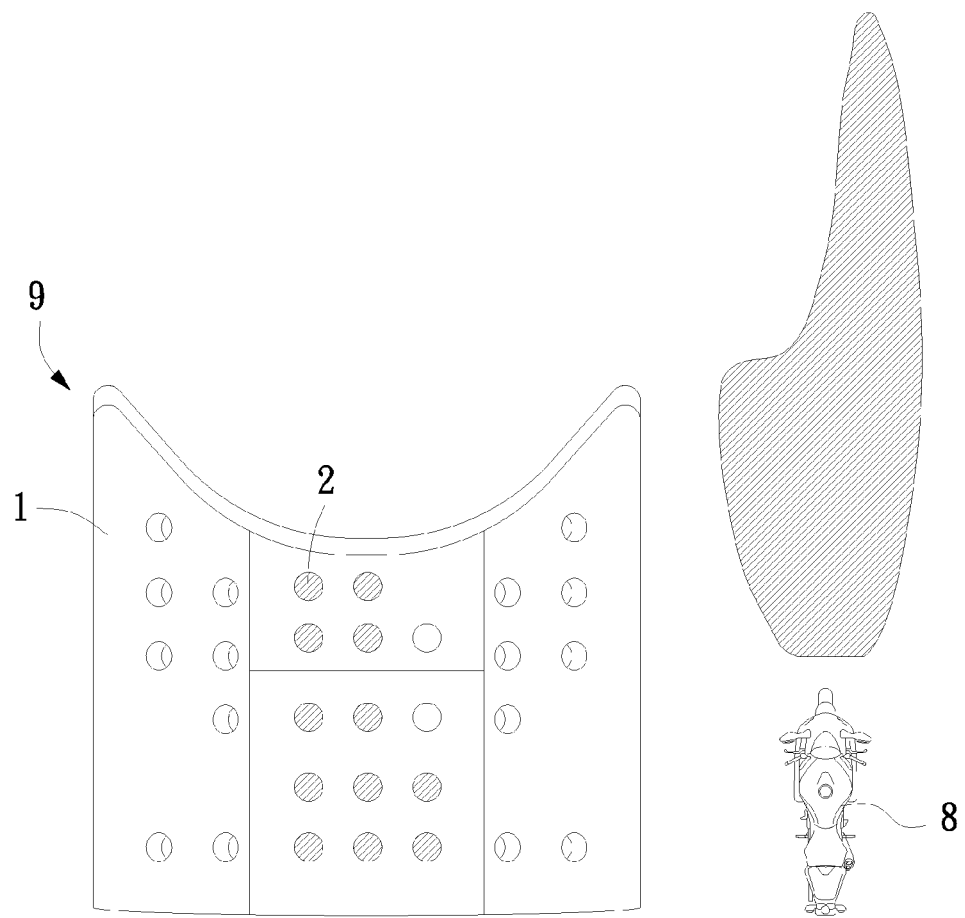
FIG. 7 illustrates the operating light sources and the illuminated area provided by the road-adaptive headlight of FIG. 1 in a third motorcycle riding condition.
Figure 8:
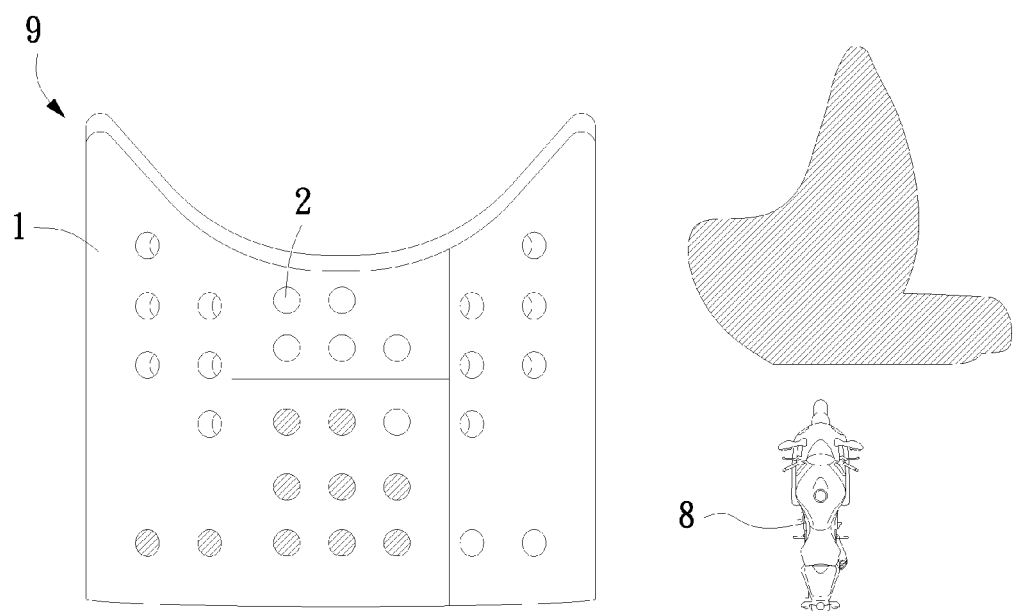
FIG. 8 illustrates the operating light sources and the illuminated area provided by the road-adaptive headlight of FIG. 1 in a fourth motorcycle riding condition.

Please refer to FIG. 1 along with FIGS. 5, 6, 7 and 8. FIG. 5 illustrates the operating LED light sources 2 and the illuminated area provided by the road-adaptive headlight for motorcycles 9 in a first motorcycle riding condition; FIG. 6 illustrates the operating LED light sources 2 and the illuminated area provided by the road-adaptive headlight for motorcycles 9 in a second motorcycle riding condition; FIG. 7 illustrates the operating LED light sources 2 and the illuminated area provided by the road-adaptive headlight for motorcycles 9 in a third motorcycle riding condition; and FIG. 8 illustrates the operating LED light sources 2 and the illuminated area provided by the road-adaptive headlight for motorcycles 9 in a fourth motorcycle riding condition.

A motorcycle 8 is illustrated in each of FIGS. 5, 6, 7 and 8, and is equipped with the above described road-adaptive headlight for motorcycles 9. Steering of light beams from the road-adaptive headlight for motorcycles 9 is achievable according to different factors, such as the position of a body of the motorcycle 8, the riding speed, the road condition, etc. That is, the controller 4 is able to control and steer the headlight beams according to different motorcycle body positions, different riding speeds, and different road conditions. For example, when the body of the motorcycle 8 inclines forward or rearward due to load shifting or due to speed-up or speed-down, the controller 4 can control and adjust a horizontal inclination angle of the headlight beams for the latter to illuminate an area at a fixed distance in front of the motorcycle 8; or when the motorcycle 8 passes through a curved road or the body of the motorcycle 8 banks at a certain angle, the controller 4 is able to control and adjust a roll angle of the headlight beams for the latter to illuminate the road surface to be passed through; or when the motorcycle 8 passes through a road crossing or changes speeds and requires a relatively wide illuminated field of view, the controller 4 is able to control and adjust the headlight beams to become wider and shorter for the motorcycle rider to clearly view the traffic flow and pedestrians at and around the road crossing; or when the motorcycle 8 changes speed and requires a shortened or an extended illuminating distance of the headlight beams, the controller 4 is able to control and tilt down or lift the headlight beams for the same to illuminate an area at a proper distance in front of the motorcycle 8.

In other words, when the road-adaptive headlight for motorcycles 9 of the present invention operates, steering or changing of the light beams from the road-adaptive headlight for motorcycles 9 can be achieved by turning the curved base plate 1 using the power source assembly 3 and/or turning on or off predetermined LED light sources 2. That is, the steering or changing of the headlight beams can be achieved according to the riding environment and the speed and angle at which the headlight beams are to be shifted. For instance, when the headlight beams are to be shifted by a relatively small angle but at a relatively quick speed, the headlight beams can be changed through changing the on and off of the LED light sources 2; or when the headlight beams are to be shifted by a relatively large angle but at a relatively slow speed, the headlight beams can be changed through turning the curved base plate 1 using the power source assembly 3; or when the headlight beams are to be shifted by a relatively large angle and at a relatively quick speed, the headlight beams can be changed through coordinately changing the on and off of the LED light sources 2 and turning the curved base plate 1 using the power source assembly 3 at the same time. Further, when the motorcycle 8 runs in different riding environments, the LED light sources 2 within one or more particular zones of the base plate 1 would be lightened to produce different light beam patterns to provide the rider with suitable road illumination.

Accordingly, as can be seen from FIGS. 3 and 5, when the motorcycle 8 is in a standard mode, i.e. in a normal riding condition, the LED light sources 2 within the main lighting zone 132 and the horizontal lighting zone 133 of the middle curved portion 13 on the base plate 1 are turned on to form an illuminated area in a shape as that shown in FIG. 5 in front of the motorcycle 8. Please refer to FIGS. 3 and 6 at the same time. When the motorcycle 8 is in a road crossing mode, i.e. passing through a road crossing, not only the LED light sources 2 within the main lighting zone 132 and the horizontal lighting zone 133 of the middle curved portion 13, but also the LED light sources 2 within the left-crossing lighting zone 112 of the left curved portion 11 and the right-crossing lighting zone 122 of the right curved portion 11 are turned on to produce an illuminated area in a shape as that shown in FIG. 6 in front of the motorcycle 8. Please refer to FIGS. 3 and 7 at the same time. When the motorcycle 8 runs in a high-speed state, all the LED light sources 2 within the high-speed lighting zone 131, the main lighting zone 132, and the horizontal lighting zone 133 of the middle curved portion 13 are turned on to produce an illuminated area in a shape as that shown in FIG. 7 in front of the motorcycle 8. Please refer to FIGS. 3 and 8 at the same time. When the motorcycle 8 is in a right-turn mode at a road crossing, both the LED light sources 2 within the main lighting zone 132 and the horizontal lighting zone 133 of the middle curved portion 13 and the LED light sources 2 within the right-crossing lighting zone 122 of the right curved portion 12 are turned on to produce an illuminated area in a shape as that shown in FIG. 8 in front of the motorcycle 8. In the case the motorcycle 8 is in a left-turn mode at a road crossing, both the LED light sources 2 within the main lighting zone 132 and the horizontal lighting zone 133 of the middle curved portion 13 and the LED light sources 2 within the left-crossing lighting zone 112 of the left curved portion 11 are turned on, and the illuminated area so produced in front of the motorcycle 8 has a shape being a laterally reversed mirror image of the illuminated area shown in FIG. 8.

From the above description, it can be found that, when a rider riding the motorcycle 8 equipped with the road-adaptive headlight for motorcycles 9 of the present invention encounters different environments during riding, the LED light sources 2 within different zones, including the left-banking lighting zone 111, the left-crossing lighting zone 112, the right-banking lighting zone 121, the right-crossing lighting zone 122, the high-speed lighting zone 131, the main lighting zone 132 and the horizontal lighting zone 133, can be turned on or off under control to thereby produce different headlight beam patterns and meet the requirements for riding in different environments, such as riding on city roads, on highways, on curved roads, through road crossings, or on watery roads. In other words, when the motorcycle 8 is changed to a different position during running, such as pitching or banking, the LED light sources 2 within different zones can be coordinately controlled and the curved base plate 1 can be adjusted in its angular position, so that the headlight beams can be horizontally or angularly adjusted to provide the rider with suitable road illumination.

With the above arrangements, it is able to eliminate the drawbacks in the conventional fixed headlight beams and to provide highly flexible headlight beam patterns. With the present invention, it is also possible to overcome the drawback of slow headlight beam changing speed as found in the general motor-driven road adaptive headlight systems. Furthermore, it is also possible to improve the problems in the conventional road adaptive headlight systems with multiple LED light sources, such as having too many LED lights, producing high amount of heat by LED lights, and non-continuous change of light beam pattern shifting, so as to achieve almost continuous headlight beam pattern shifting. Therefore, with the road-adaptive headlight for motorcycles of the present invention, the number of blind spots in headlight illumination can be largely reduced and the flexibility of the headlight beam patterns can be increased to expand the range and area of the headlight illumination and enable upgraded safety in riding motorcycle.

In other words, according to the configuration of the present invention, a plurality of LED light sources are arranged on a curved base plate at specific positions and angles, and the whole base plate can be driven by a power source assembly to turn in different directions, so that motorcycle headlight beams can be quickly and flexibly steered to produce different headlight beam patterns, ensuring good road visibility and increased safety in motorcycle riding.

Accordingly, the road-adaptive headlight for motorcycles according to the present invention is novel, improved, and industrially practical for use. It is trusted products derived from the present invention would fully satisfy the current market demands for road-adaptive headlight for motorcycles.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A road-adaptive headlight for motorcycles, comprising:
   a base plate being a curved member and including a left curved portion,
   a right curved portion, and a middle curved portion located between the left and the right curved portion; the left curved portion being divided from top to bottom into a left-banking lighting zone and a left-crossing lighting zone; the right curved portion being divided from top to bottom into a right-banking lighting zone and a right-crossing lighting zone;
   and the middle curved portion being divided from top to bottom into a high-speed lighting zone, a main lighting zone, and a horizontal lighting zone;
   a plurality of LED light sources being provided within each of the left-banking lighting zone, the left-crossing lighting zone, the right-banking lighting zone, the right-crossing lighting zone, the high-speed lighting zone, the main lighting zone, and the horizontal lighting zone;
   a power source assembly being connected to the base plate for driving the base plate to incline upward or downward and to turn clockwise or counterclockwise; and
   a controller being electrically connected to the plurality of LED light sources and the power source assembly.

2. The road-adaptive headlight for motorcycles as claimed in claim 1, wherein the power source assembly includes a first power source and a second power source; the first power source driving the base plate to incline upward or downward, and the second power source driving the base plate to turn clockwise or counterclockwise.

3. The road-adaptive headlight for motorcycles as claimed in claim 2,
wherein the first power source is connected to the base plate via a guide screw rod for driving the base plate to incline upward or downward, and the second power source is connected to the base plate via a connecting rod for driving the base plate to turn clockwise or counterclockwise.

4. The road-adaptive headlight for motorcycles as claimed in claim 2,
wherein the first power source and the second power source are respectively a motor.

5. The road-adaptive headlight for motorcycles as claimed in claim 1,
wherein the base plate has a vertical curve angle about two degrees and a horizontal curve angle about ten degrees.

\* \* \* \* \*